(12) United States Patent
Giannakopoulos (10) Patent No.: US 11,067,090 B1
(45) Date of Patent: Jul. 20, 2021

(54) INTEGRAL ROTOR BORE AND BORE BASKET

(71) Applicant: United Technologies Corporation, Farmington, CT (US)

(72) Inventor: Konstantinos P. Giannakopoulos, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/797,839

(22) Filed: Feb. 21, 2020

(51) Int. Cl.
*F04D 29/04* (2006.01)
*F04D 27/00* (2006.01)
*F04D 25/14* (2006.01)
*F01D 25/14* (2006.01)

(52) U.S. Cl.
CPC ............ *F04D 29/04* (2013.01); *F01D 25/145* (2013.01); *F04D 27/009* (2013.01)

(58) Field of Classification Search
CPC ....... F04D 29/04; F04D 27/009; F01D 25/145
USPC .................................................. 310/58, 59
See application file for complete search history.

(56) References Cited

U.S. PATENT DOCUMENTS

| 5,271,711 A | 12/1993 | McGreehan |
| 10,280,792 B2 | 5/2019 | Gons |
| 2015/0240723 A1* | 8/2015 | Gons ........................ F01D 25/12 60/726 |
| 2019/0242407 A1* | 8/2019 | Giannakopoulos ..... F04D 19/02 |
| 2019/0284999 A1* | 9/2019 | Giannakopoulos ..... F01D 5/082 |
| 2019/0292995 A1* | 9/2019 | Behling .................... F02C 6/08 |

FOREIGN PATENT DOCUMENTS

| EP | 2910735 B1 | 7/2020 |
| FR | 2892148 B1 | 7/2011 |

OTHER PUBLICATIONS

EP search report for EP20216101.4 dated Mar. 22, 2021.

* cited by examiner

*Primary Examiner* — Thomas Truong
(74) *Attorney, Agent, or Firm* — Getz Balich LLC (57) ABSTRACT

An apparatus is provided that includes a rotor bore and a bore basket. The bore basket extends axially between a first and second axial ends. The bore basket includes an engagement panel, and cylindrical inner and outer radial panels. The inner and outer radial panels extend substantially between the first and second axial ends. The inner radial panel is disposed radially inside of and separated from the outer radial panel, defining an annular passage disposed there between. The bore basket includes a plurality of inlet apertures in fluid communication with the annular passage at a first axial position, and a plurality of exit apertures in fluid communication with the annular passage at a second axial position. The second axial end of the bore basket is attached to an inner radial hub of the rotor bore, and the rotor bore and bore basket are a unitary structure.

18 Claims, 7 Drawing Sheets

INTEGRAL ROTOR BORE AND BORE BASKET

This invention was made with Government support awarded by the United States. The Government has certain rights in this invention.

BACKGROUND OF THE INVENTION

1. Technical Field

The present disclosure relates to gas turbine engines in general, and to bore baskets for gas turbine engines in particular.

2. Background Information

Gas turbine engines typically include a compressor section, a combustor section, and a turbine section. Some gas turbine engines typically include a fan section disposed axially forward of the combustor section. One or more shafts connect compressor stages to turbine stages. The compressor section and the turbine section each include multiple rotor stages arranged sequentially along a fluid flow path. Each rotor stage includes a rotor bore protruding radially inward toward the shafts. High temperature air in communication with a rotor bore can cause the rotor bore to experience thermal expansion. To control such thermal expansion, gas turbine engine are known to dispose a bore basket between one or more rotor bores and the shafts to mechanically separate the rotor bores from hot air flow adjacent the shafts. The bore basket functions as both as a heat shield and as a flow guide.

Bore baskets are typically configured as a cylindrical structure that includes a radially inner tube displaced from a radially outer tube to define an interior annular region there between for the passage of gas. Existing bore baskets are formed from a plurality of elements that collectively form the bore basket. Those elements must be manufactured to tight tolerances and assembled to one another to create the interior annular region and requisite sealing between elements. For example, in some instances the outer radial tube must be thermally expanded to permit receipt of the inner tube. Once the outer radial tube is cooled (e.g., to the temperature of the inner radial tube), the inner and outer radial tubes are mechanically connected. Such techniques can cause the assembly process to be time consuming and expensive. The elements themselves will often be subject to different degrees of thermal expansion; e.g., because of different physical configuration, different materials, and/or their position in the engine and consequent thermal exposure. As a result, the different elements "fitted together" must allow for different relative amounts of thermal expansion. The mechanical features that maintain the bore basket elements together (anti-rotation keys, snaps, etc.), but still allow for thermal expansion, can produce wear points that limit the life of the bore basket.

What is needed is a bore basket that improves upon existing bore basket design.

SUMMARY

According to an aspect of the present disclosure, an apparatus is provided that includes a rotor bore and a bore basket. The rotor bore includes an inner radial hub. The bore basket extends axially between a first axial end and a second axial end opposite the first axial end. The bore basket includes an engagement panel, a cylindrical inner radial panel, and a cylindrical outer radial panel. The engagement panel is disposed at the first axial end. The inner and outer radial panels extend substantially between the first axial end and the second axial end. The inner radial panel is disposed radially inside of and separated from the outer radial panel. An annular passage is disposed between the inner and outer radial panels. The bore basket includes a plurality of inlet apertures in fluid communication with the annular passage at a first axial position. The bore basket includes a plurality of exit apertures in fluid communication with the annular passage at a second axial position, the second axial position separated from the first axial position. The second axial end of the bore basket is attached to the inner radial hub of the rotor bore, and the rotor bore and bore basket are a unitary structure.

In any of the aspects or embodiments described above and herein, the plurality of inlet apertures may extend through the outer radial panel at the first axial position.

In any of the aspects or embodiments described above and herein, the plurality of exit apertures may extend through the outer radial panel at the second axial position.

In any of the aspects or embodiments described above and herein, the plurality of inlet apertures and the plurality of exit apertures may be circumferentially disposed around the outer radial panel.

In any of the aspects or embodiments described above and herein, the rotor bore and the bore basket may comprise the same material.

In any of the aspects or embodiments described above and herein, the inner radial panel and the outer radial panel may be welded to one another, and the bore basket and the rotor bore may be welded to one another.

According to another aspect of the present disclosure, a gas turbine engine rotor section is provided that includes a plurality of rotor stages and a bore basket. Each rotor stage has a rotor bore with an inner radial hub. The rotor stages are connected to one another by a hub structure, the hub structure in part defining a bore cavity. The bore basket extends axially between a first axial end and a second axial end opposite the first axial end. The bore basket includes an engagement panel, a cylindrical inner radial panel, and a cylindrical outer radial panel. The engagement panel is disposed at the first axial end. The inner and outer radial panels extend substantially between the first axial end and the second axial end. The inner radial panel is disposed radially inside of and separated from the outer radial panel. An annular passage is disposed between the inner and outer radial panels. The bore basket includes a plurality of inlet apertures in fluid communication with the annular passage at a first axial position. The bore basket includes a plurality of exit apertures in fluid communication with the annular passage at a second axial position, the second axial position axially separated from the first axial position. The bore basket is integrally formed with a first rotor bore of a first rotor stage of the plurality of rotor stages, and the second axial end of the bore basket extends outwardly from the inner radial hub of the first rotor bore. The engagement panel is connected to the hub structure. The hub structure, the bore basket, and the first rotor bore define a sub-section of the bore cavity, the sub-section including a second rotor bore of a second rotor stage of the plurality of rotor stages.

In any of the aspects or embodiments described above and herein, the first rotor bore and the bore basket may comprise the same material.

In any of the aspects or embodiments described above and herein, the inner radial panel and the outer radial panel may be welded to one another, and the bore basket and the first rotor bore may be welded to one another.

In any of the aspects or embodiments described above and herein, the sub-section may include at least two said rotor bores.

In any of the aspects or embodiments described above and herein, the hub structure (HS) may include a plurality of HS inlet apertures and a plurality of HS exit apertures, and the plurality of HS inlet apertures and the plurality of HS exit apertures are in fluid communication with the sub-section of the bore cavity.

In any of the aspects or embodiments described above and herein, the sub-section may be located at a forward portion of the bore cavity.

In any of the aspects or embodiments described above and herein, the sub-section may be located at an aft portion of the bore cavity.

In any of the aspects or embodiments described above and herein, the rotor section may further include a second bore basket having a second engagement panel, a second cylindrical inner radial panel, and a second cylindrical outer radial panel. The second inner and outer radial panels extend axially. The second inner radial panel is disposed radially inside of and separated from the second outer radial panel. A second annular passage is disposed between the second inner and outer radial panels. The second bore basket includes a plurality of second inlet apertures in fluid communication with the second annular passage. The second bore basket includes a plurality of second exit apertures in fluid communication with the second annular passage. The second inlet apertures are axially separated from the second exit apertures. The second bore basket is integrally formed with a third rotor bore of a third rotor stage of the plurality of rotor stages, and extends outwardly from the inner radial hub of the third rotor bore. The second engagement panel is connected to the hub structure. The hub structure, the second bore basket, and the third rotor bore define a second sub-section of the bore cavity. The second sub-section includes a fourth rotor bore of a fourth rotor stage of the plurality of rotor stages.

In any of the aspects or embodiments described above and herein, the rotor section is a compressor section.

In any of the aspects or embodiments described above and herein, the rotor section is a turbine section.

DETAILED DESCRIPTION

A detailed description of one or more embodiments of the disclosed apparatus and method are presented herein by way of exemplification and not limitation with reference to the Figures.

Figure 1:
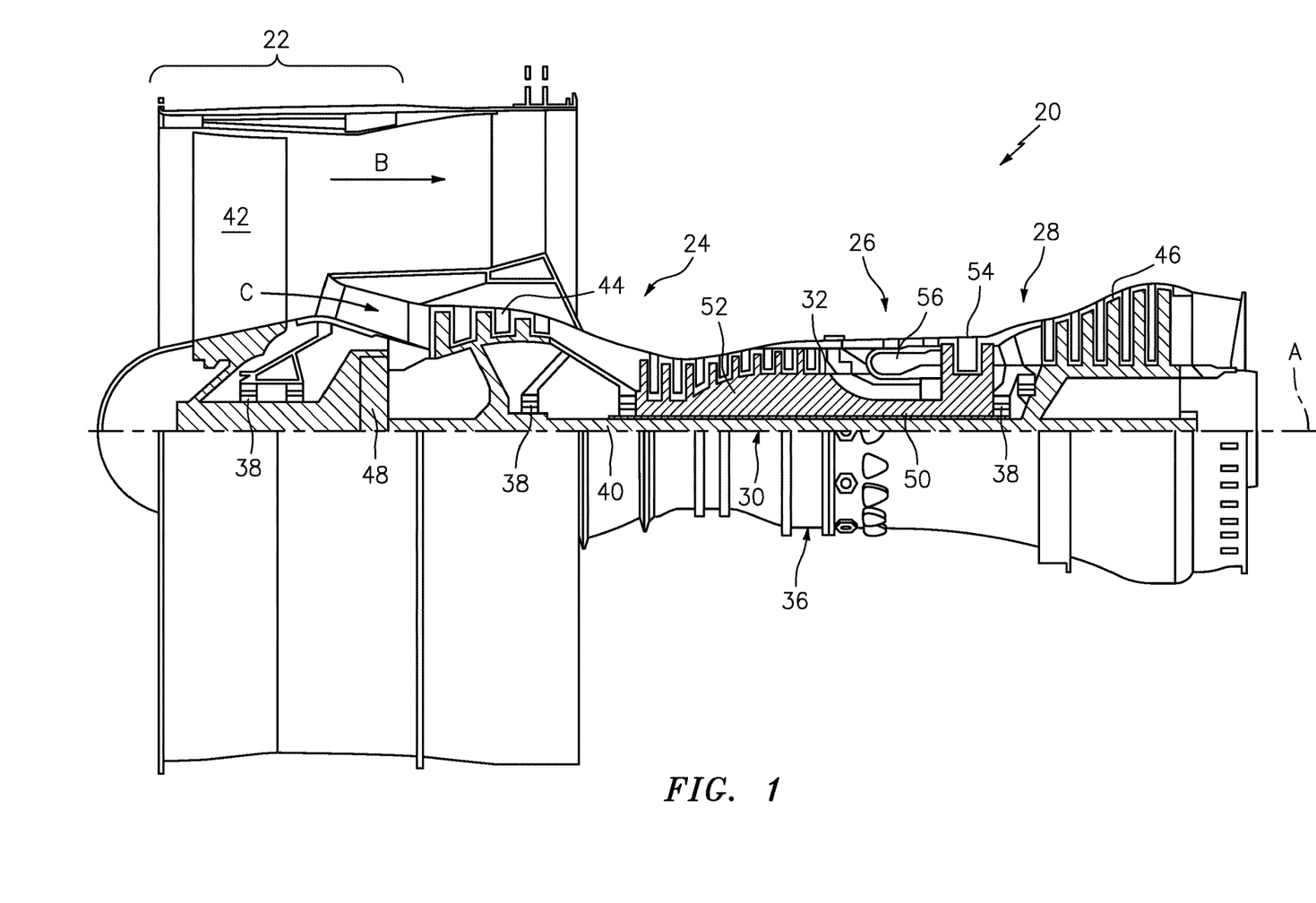
FIG. 1 is a diagrammatic partial view of a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis "A" relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The gas turbine engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blades alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

Figure 2:
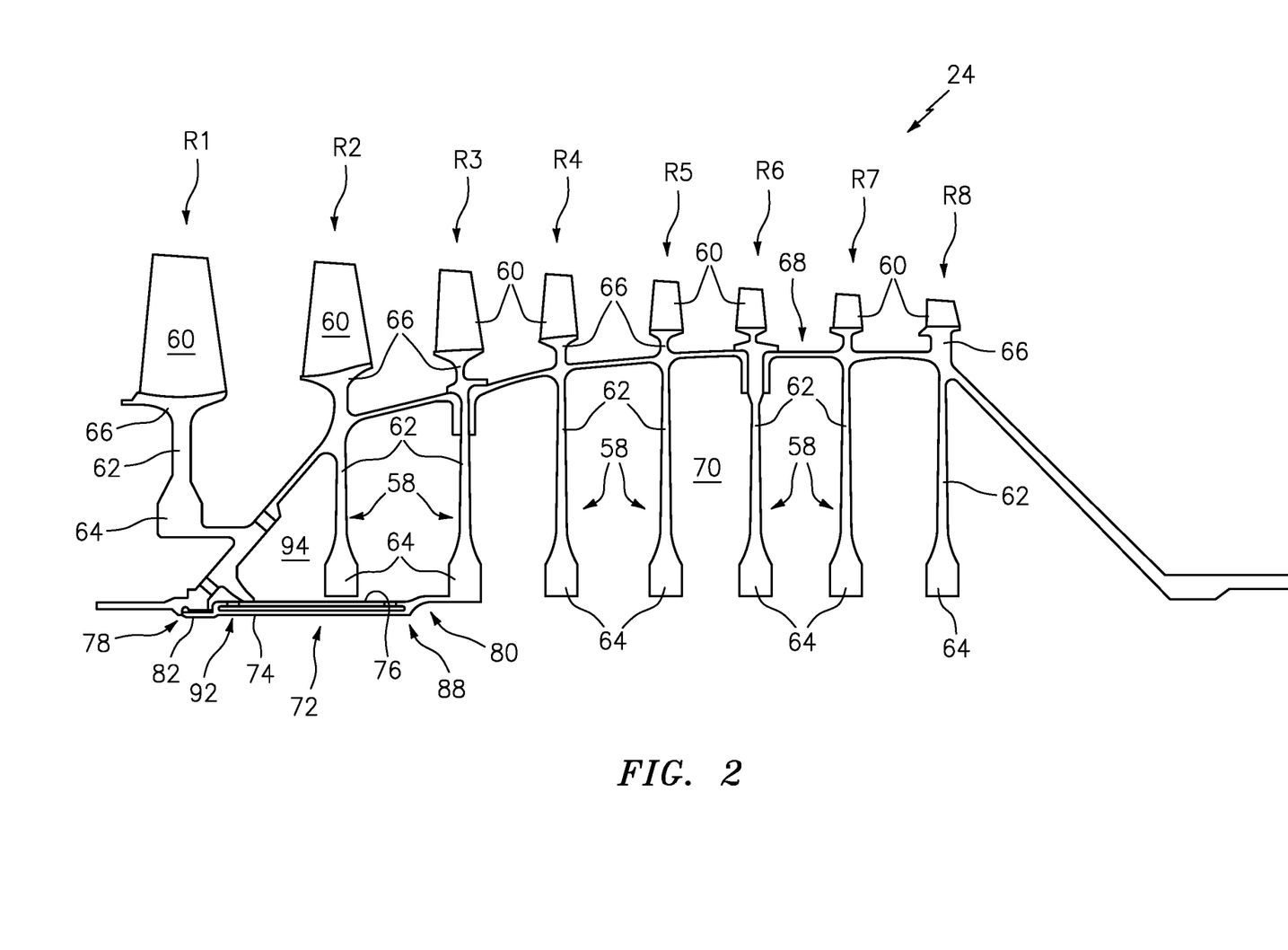
FIG. 2 is a diagrammatic view of a compressor section embodiment.

Referring now to FIG. 2, the compressor section 24 of a gas turbine engine 20 is illustrated in greater detail. The compressor section 24 includes a plurality of rotor stages 58. Each rotor stage 58 includes a plurality of rotor blades 60 connected to a respective rotor bore 62. The rotor bore 62 includes an inner radial hub 64 and an outer radial hub 66. In the illustrated embodiment, eight rotor stages 58 are included, but it is to be appreciated that a compressor section 24 may contain fewer or more rotor stages. The present disclosure is not limited to use any particular compressor section 24 configuration. In addition, the present disclosure is not limited to use in compressor sections, and may for example be utilized in a turbine section.

As shown in FIG. 2, the rotor bores 62 may be directly or indirectly coupled to each other in any suitable manner to form a hub structure 68. Radially inward of the hub structure 68 is a bore cavity 70. The rotor bores 62 extend radially inwardly from the rotor blades 60 into the bore cavity 70. The rotor bores 62 extend radially inwardly toward one or more central shafts; e.g., inner shaft 40 and outer shaft 50 as shown in FIG. 1.

Figure 2A:
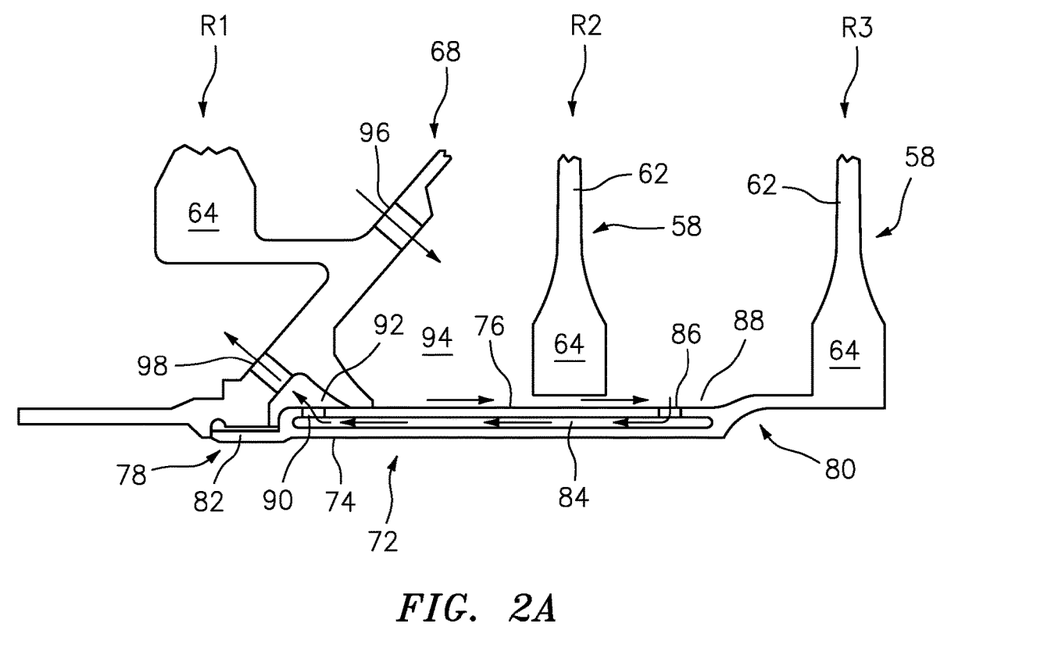
FIG. 2A is an enlarged portion of the compressor section shown in FIG. 2.
Figure 3:
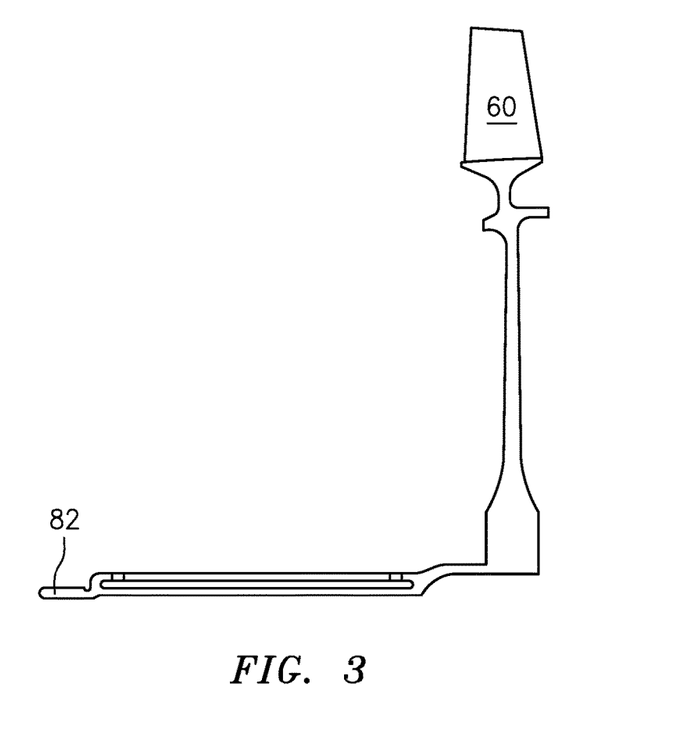
FIG. 3 is a diagrammatic view of an integrally formed rotor bore and bore basket embodiment.
Figure 4:
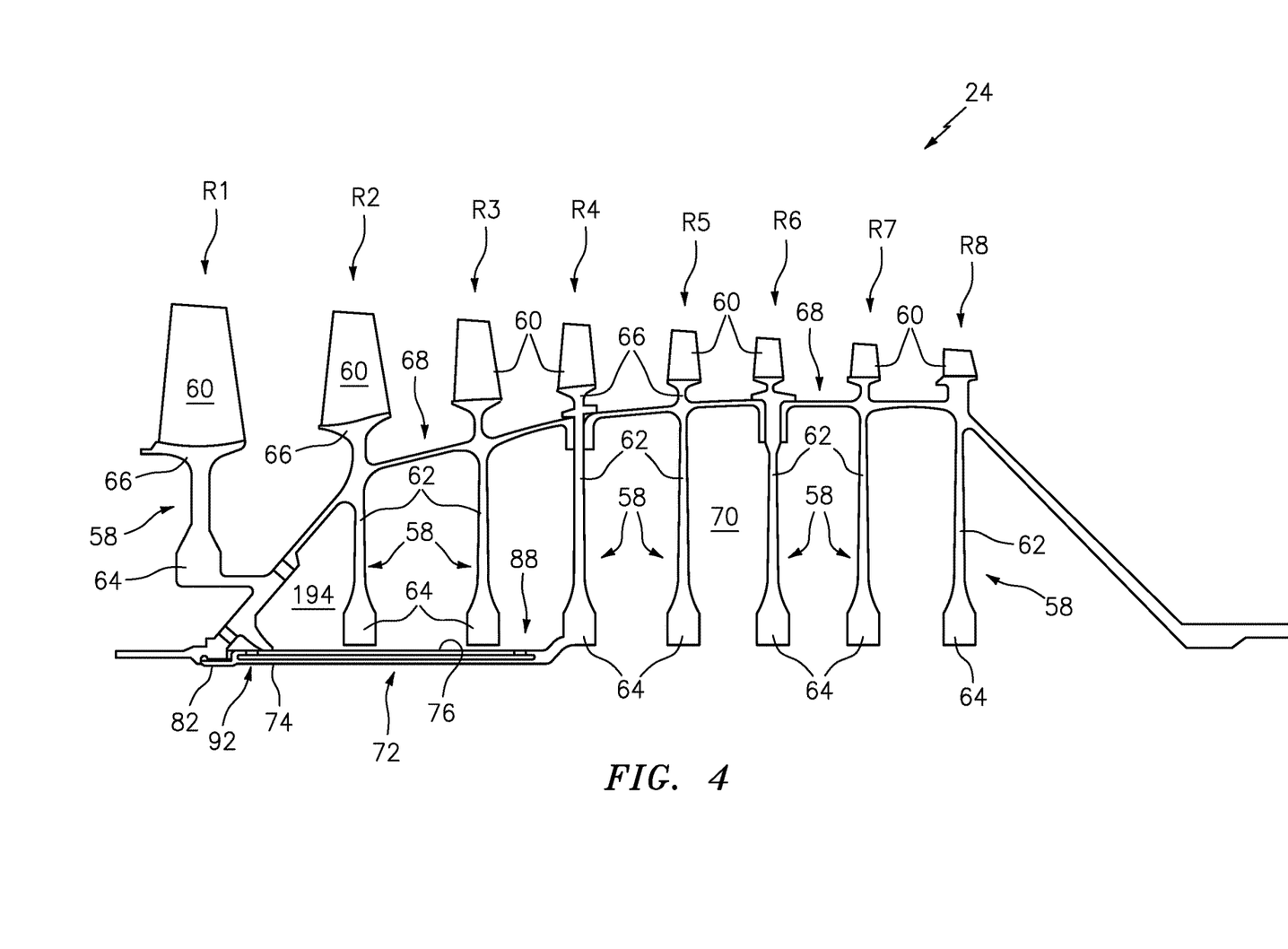
FIG. 4 is a diagrammatic view of a compressor section embodiment.

Referring to FIGS. 2-4, the compressor section 24 includes a rotor stage 58 including an integrally formed rotor disk 62 and bore basket 72. A plurality of rotor blades 60 are attached to the outer radial hub 66 of the rotor bore 62. The rotor blades 60 may be integrally formed with the rotor bore 62, or attached by mechanical means. The present disclosure is not limited to any particular method for attaching rotor blades 60 to a rotor bore 62.

The bore basket 72 includes a substantially cylindrical structure that includes an inner radial panel 74 and an outer radial panel 76 extending axially between a first axial end 78 and a second axial end 80. The inner and outer radial panels 74, 76 may be formed in a single process (e.g., additive manufacturing, etc.) or may be a weldment that forms this portion of the unitary structure described herein. The present disclosure is not limited to any particular process for forming the bore basket 72 as a unitary structure. The bore basket 72 is attached to an inner radial hub 64 of the rotor bore 62 at the second axial end 80 of the bore basket 72. Non-limiting means of attachment between bore basket 72 and the rotor bore 62 include welding, or the like. The present disclosure is not limited to any particular process for attaching the bore basket 72 to the rotor bore 62. In some embodiments, the integrally formed rotor bore 62 and bore basket 72 may be manufactured in a single process, and the present disclosure is not limited to any process for manufacturing the same. The bore basket 72 includes an engagement panel 82 disposed at the first axial end 78. The inner radial panel 74 is disposed radially inside of, and separated from, the outer radial panel 76, thereby defining an annular passage 84 there between. The annular passage 84 may by circumferentially continuous, or it may be separated into circumferential segments. The bore basket 72 includes a plurality of inlet apertures 86 disposed at a first axial position 88, and a plurality of exit passages 90 disposed at a second axial position 92. The second axial position 92 is axially separated from the first axial position 88. The plurality of inlet apertures 86 are distributed around the circumference of the bore basket 72. The plurality of exit apertures 90 are distributed around the circumference of the bore basket 72. The physical characteristics of the inlet and exit apertures 86, 90 (e.g., the respective number, size, geometry, circumferential spacing, etc.) may be varied to provide desired metered fluid flow characteristics for different applications. In the embodiment shown in FIG. 3, the inlet apertures 86 are disposed within the outer radial panel 76 proximate the second axial end 80 of the bore basket 72, and the exit apertures 90 are disposed within the outer radial panel 76 proximate the first axial end 78 of the bore basket 72. The present disclosure is not limited to inlet apertures 86 disposed proximate the second axial end 80 of the bore basket 72 and/or exit apertures 90 disposed proximate the first axial end 78 of the bore basket 72. The engagement panel 82 may be configured to mechanically couple with a portion of the hub structure 68 to restrict air flow out of the bore cavity 70. For example, in the embodiments shown in FIGS. 2, 2A, 4, and 4A, the engagement panel 82 is coupled with a portion of the hub structure 68 disposed radially inside of the first rotor stage ("R1"). The mechanical coupling between the engagement panel 82 and the hub structure 68 may take the form of one or more of a press fit, an interference fit, a male/female pair, a threaded engagement, or the like. The present disclosure is not limited to any particular engagement panel 82 configuration, and/or any particular type of mechanical coupling between the engagement panel 82 and the hub structure 68.

The integrally formed rotor bore 62 and bore basket 72 are a unitary structure. The term "unitary structure" as used herein means a single component, wherein all elements of the bore basket 72 and the rotor bore 62 (e.g., the inner radial panel 74, the outer radial panel 76, the engagement panel 82, and the rotor bore 62) are an inseparable body; e.g., formed of a single material, or a weldment of independent elements, etc.

The axial length of the bore basket 72 between the first axial end 78 and the second axial end 80 can vary depending on the application. In the embodiment shown in FIGS. 2 and 3, for example, the axial length of the bore basket 72 is such that a sub-section 94 of the bore cavity 70 is created that includes one rotor bore 62 (i.e., from rotor stage "R2"). In the embodiment shown in FIG. 4, for example, the axial length of the bore basket 72 is such that a sub-section 194 of the bore cavity 70 is created that includes two rotor bores 62 (from rotor stages "R2" and "R3"). The present disclosure integrally formed rotor bore 62 and bore basket 72 is not limited to any particular axial length. The present disclosure integrally formed rotor bore 62 and bore basket is also limited to forming a bore cavity sub-section that includes any particular number of rotor bores 62; i.e., the formed bore cavity sub-section contains at least one rotor bore 62.

Figure 5:
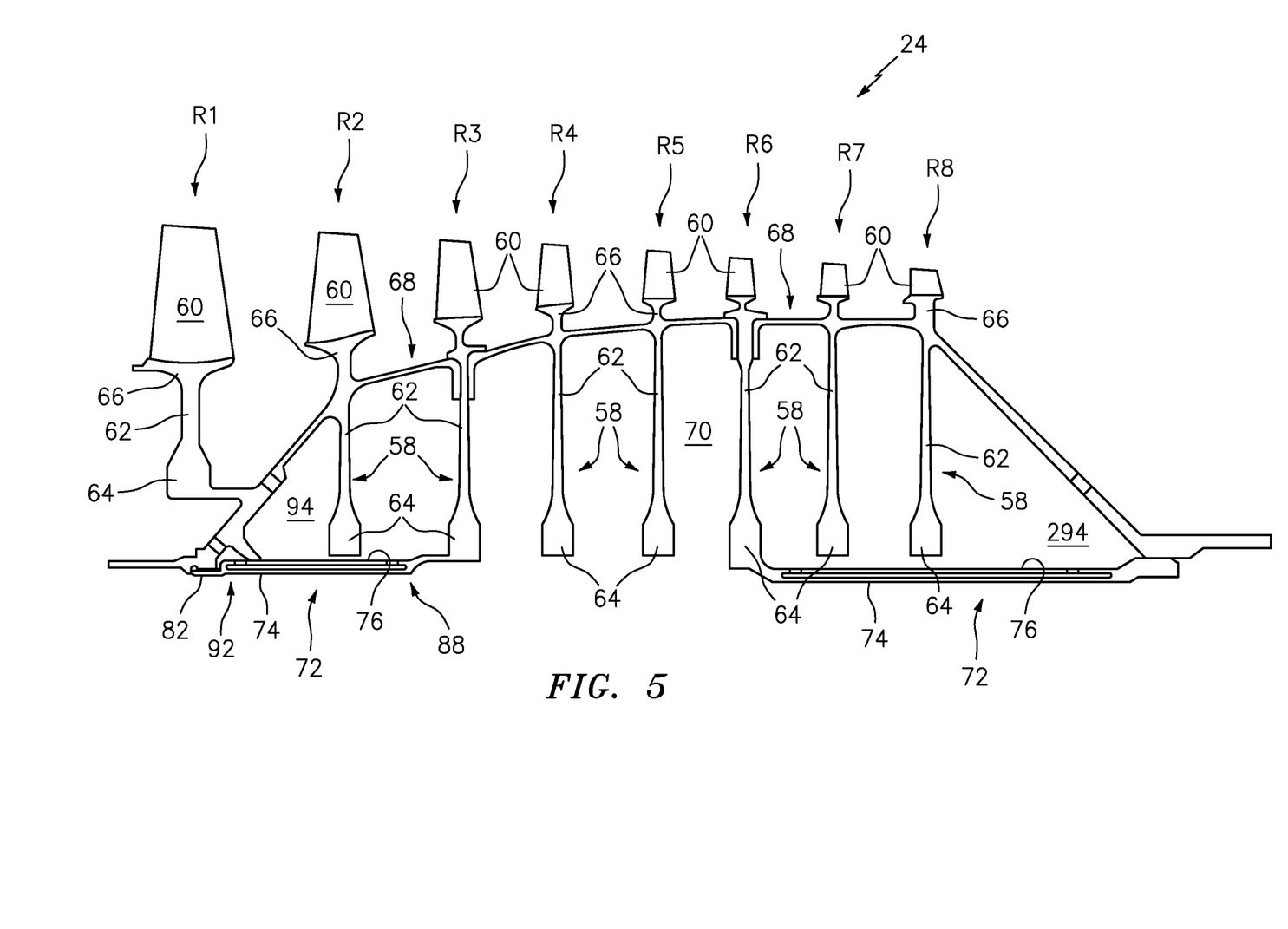
FIG. 5 is a diagrammatic view of a compressor section embodiment.

FIG. 5 illustrates an embodiment wherein the compressor section includes an integrally formed rotor bore 62 and bore basket 72 disposed toward the aft of the compressor section 24. In this embodiment, the bore basket 72 is as described above. Embodiments of the present disclosure include compressor section 24 embodiments that include only a forward disposed integrally formed rotor bore 62 and bore basket 72 (e.g., see FIGS. 2-4), or only an aft disposed integrally formed rotor bore 62 and bore basket 72, or both (e.g., see FIG. 5).

Referring to FIGS. 2 and 2A, a compressor section having an integrally formed rotor bore 62 and bore basket 72 embodiment according to the present disclosure is shown. In this embodiment, the integrally formed rotor bore 62 and bore basket 72 and the hub structure 68 define a sub-section 94 of the bore cavity 70 that is sealed off from the remainder of the bore cavity 70. The sub-section 94 includes one rotor bore 62 (from rotor stage "R2"). Air at a pressure greater than the ambient pressure within the sub-section 94 enters the sub-section 94 through apertures 96 disposed within the hub structure 68. This air (typically at a lower temperature than the air environment adjacent the shafts) may be referred to as conditioning air. The conditioning air travels aft through the sub-section 94, and though the radial passages disposed between the rotor bore 62 (from rotor stage "R2") and the outer radial panel 76 of the bore basket 72. The conditioning air subsequently enters the annular passage 84 of the bore basket 72 via the inlet apertures 86 and travels forward within the bore basket 72. The conditioning air subsequently exits the annular passage 84 through the exit apertures 90, and then exits the bore cavity 70 via apertures 98 within the hub structure 68 and into an adjacent chamber of the gas turbine engine 20. The conditioning air thermally conditions (e.g., cools) the included rotor bore 62 (from rotor stage "R2") and the integrally formed rotor bore 62 (from rotor stage "R3") and bore basket 72 that at least partially defines the bore cavity sub-section 94.

Figure 4A:
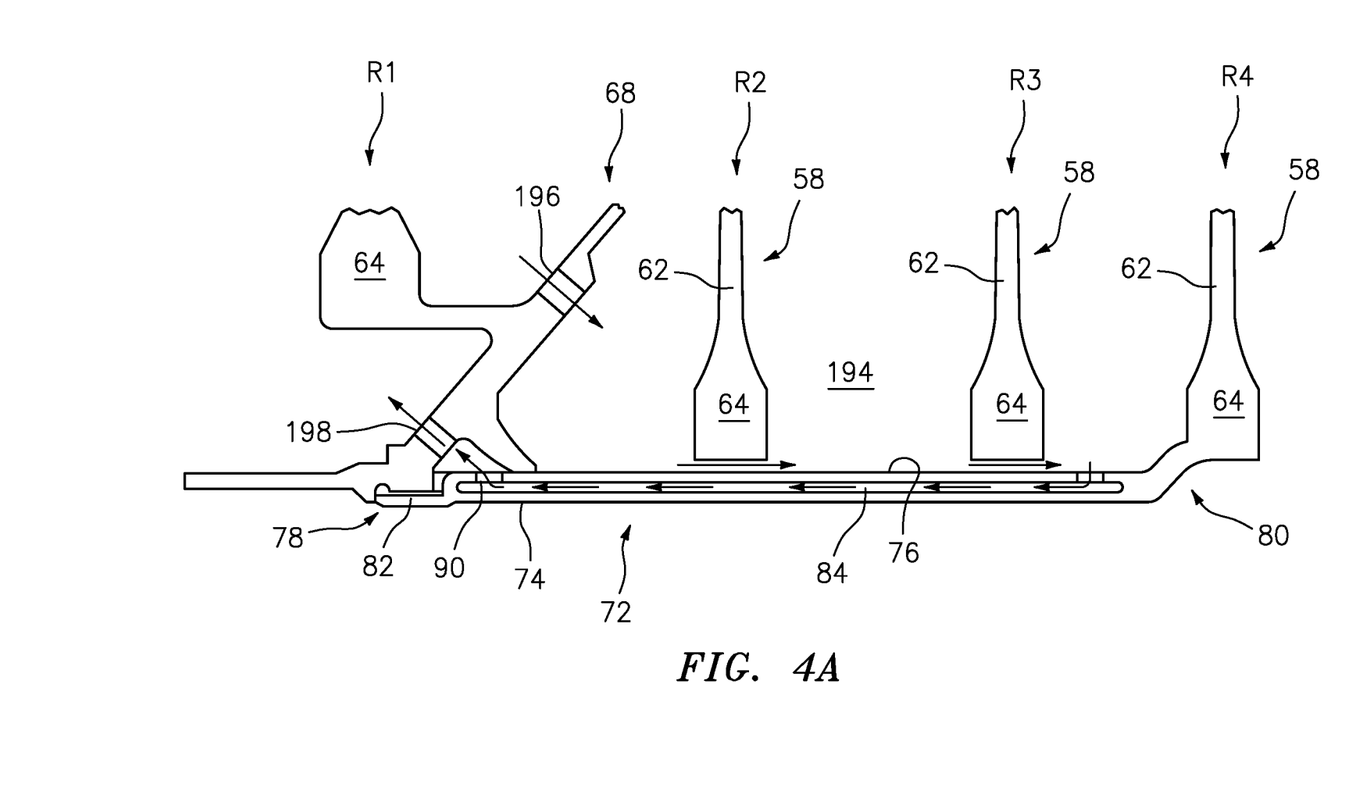
FIG. 4A is an enlarged portion of the compressor section shown in FIG. 4.

Referring to FIGS. 4 and 4A, a compressor section having an integrally formed rotor bore 62 and bore basket 72 embodiment according to the present disclosure is shown. In this embodiment, the integrally formed rotor bore 62 and bore basket 72 and the hub structure 68 define a sub-section 194 of the bore cavity 70 that is sealed off from the remainder of the bore cavity 70. The sub-section 194 includes two rotor bores 62 (from rotor stages "R2" and "R3"). Conditioning air (as described above) enters the sub-section 194 through apertures 196 disposed within the hub structure 68. The conditioning air travels aft through the sub-section 194, and though the radial passages disposed between the rotor bores 62 (from rotor stages "R2" and "R3") and the outer radial panel 76 of the bore basket 72. The conditioning air subsequently enters the annular passage 84 of the bore basket 72 via the inlet apertures 86 and travels forward within the bore basket 72. The conditioning air subsequently exits the annular passage 84 through the exit apertures 90, and then exits the bore cavity sub-section 194 via apertures 198 within the hub structure 68 and into an adjacent chamber of the gas turbine engine. The conditioning air thermally conditions (e.g., cools) the included rotor bores 62 (from rotor stages "R2" and "R3") and the integrally formed rotor bore 62 (from rotor stage "R4") and bore basket 72 that at least partially defines the bore cavity sub-section 194.

Figure 5A:
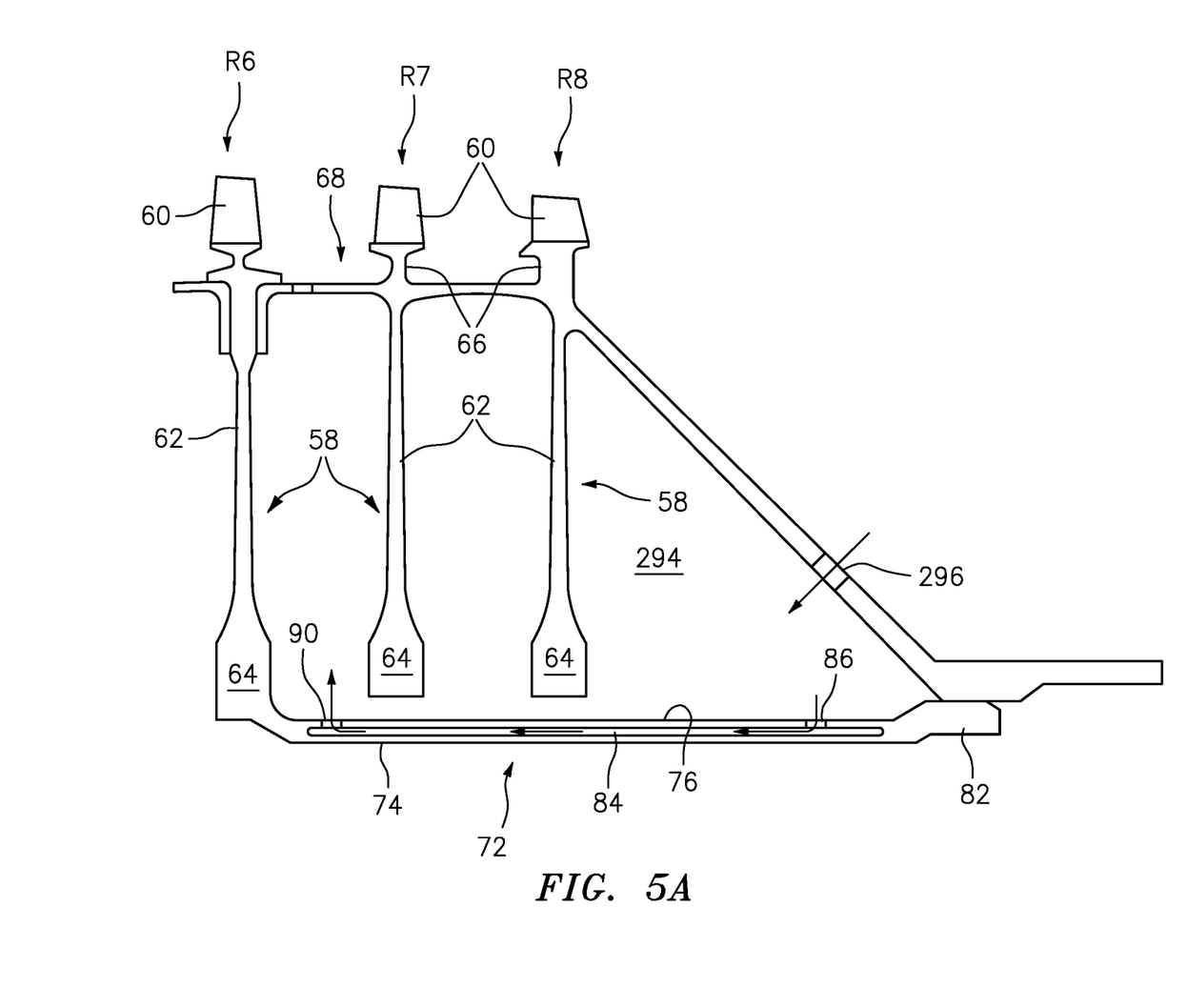
FIG. 5A is an enlarged portion of the compressor section shown in FIG. 5.

Referring to FIGS. 5 and 5A, a compressor section having an integrally formed rotor bore 62 and bore basket 72 embodiment according to the present disclosure is shown. In this embodiment, the integrally formed rotor bore 62 and bore basket 72 and the hub structure 68 define a sub-section 294 of the bore cavity 70 that is sealed off from the remainder of the bore cavity 70. The sub-section 294 includes two rotor bores 62 (from rotor stages "R7" and "R8"). Conditioning air (as described above) enters the sub-section 294 through apertures 296 disposed within the hub structure 68. At least a portion of the conditioning air enters the annular passage 84 of the bore basket 72 via the inlet apertures 86 and travels aft within the bore basket 72. The conditioning air subsequently exits the annular passage 84 through the exit apertures 90, and then exits the sub-section 294 via apertures 298 and into an adjacent chamber of the gas turbine engine. The conditioning air thermally conditions (e.g., cools) the included rotor bores 62 (from rotor stages "R7" and "R8") and the integrally formed rotor bore 62 (from rotor stage "R6") and bore basket 72 that at least partially defines the bore cavity sub-section 294.

The conditioning fluid circuits within the bore cavity sub-sections 94, 194, 294 (made possible by the integrally formed rotor bore 62 and bore basket 72 embodiments), provide conditioning of the rotor bores 62 within the respective sub-section 94, 194, 294 that facilitates uniform growth of the rotor bores 62 (via thermal expansion) for different rotor bore 62 materials and rotor bore 62 configurations. The bore cavity sub-section 94, 194, 294 conditioning also facilitates tip clearance control of the rotor blade tips relative to an outer casing surrounding the rotor blades 60. Embodiments of the present disclosure integrally formed rotor bore 62 and bore basket 72 embodiment also provide a bore basket 72 with improved sealing. Bore baskets formed from a plurality of different elements require sealing joints at most element intersections. Differential growth between elements can complicate and/or compromise sealing at these element intersections. Embodiments of the present disclosure integrally formed rotor bore 62 and bore basket 72 embodiment also provide a bore basket that eliminates mechanical wear points. As stated above, bore baskets formed from a plurality of different elements require joints between elements that permit relative movement between elements, and that relative movement can produce undesirable wear. The present disclosure integrally formed rotor bore 62 and bore basket 72 embodiments do not include such relative movement joints, and thereby avoid potential undesirable wear. Embodiments of the present disclosure integrally formed rotor bore 62 and bore basket 72 also provide a bore basket 72 that decreases the potential for foreign object damage ("FOD"). Bore baskets formed from a plurality of different elements often include smaller elements (e.g., fasteners, anti-rotation keys, etc.). If such elements work free during operation of the gas turbine engine, the aforesaid elements may travel within the engine and can potentially cause damage. Embodiments of the present disclosure integrally formed rotor bore 62 and bore basket 72 embodiment do not include such elements and therefore reduce the potential for FOD.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus, comprising:
   a rotor bore having an inner radial hub;
   a bore basket extending axially between a first axial end and a second axial end opposite the first axial end, the bore basket having:
     an engagement panel disposed at the first axial end;
     a cylindrical inner radial panel;
     a cylindrical outer radial panel, wherein the inner radial panel and the outer radial panel extend substantially between the first axial end and the second axial end, and the inner radial panel is disposed radially inside of and separated from the outer radial panel, and an annular passage is disposed between the inner radial panel and the outer radial panel;
     a plurality of inlet apertures in fluid communication with the annular passage at a first axial position; and
     a plurality of exit apertures in fluid communication with the annular passage at a second axial position, the second axial position separated from the first axial position;
   wherein the second axial end of the bore basket is attached to the inner radial hub of the rotor bore, and the rotor bore and bore basket are a unitary structure.

2. The apparatus of claim 1, wherein the plurality of inlet apertures extend through the outer radial panel at the first axial position.

3. The apparatus of claim 1, wherein the plurality of exit apertures extend through the outer radial panel at the second axial position.

4. The apparatus of claim 1, wherein the plurality of inlet apertures and the plurality of exit apertures are circumferentially disposed around the outer radial panel.

5. The apparatus of claim 1, wherein the rotor bore and the bore basket comprise the same material.

6. The apparatus of claim 1, wherein the inner radial panel and the outer radial panel are welded to one another, and the bore basket and the rotor bore are welded to one another.

7. A gas turbine engine rotor section, comprising:
   a plurality of rotor stages, each rotor stage having a rotor bore with an inner radial hub, the rotor stages connected to one another by a hub structure, the hub structure in part defining a bore cavity; and
   a bore basket extending axially between a first axial end and a second axial end opposite the first axial end, the bore basket having:
     an engagement panel disposed at the first axial end;
     a cylindrical inner radial panel;
     a cylindrical outer radial panel, wherein the inner radial panel and the outer radial panel extend substantially between the first axial end and the second axial end, and the inner radial panel is disposed radially inside of and separated from the outer radial panel, and an annular passage is disposed between the inner radial panel and the outer radial panel;
     a plurality of inlet apertures in fluid communication with the annular passage at a first axial position; and
     a plurality of exit apertures in fluid communication with the annular passage at a second axial position, the second axial position axially separated from the first axial position;
   wherein the bore basket is integrally formed with a first rotor bore of a first rotor stage of the plurality of rotor stages, and the second axial end of the bore basket extends outwardly from the inner radial hub of the first rotor bore; and
   wherein the engagement panel is connected to the hub structure; and
   wherein the hub structure, the bore basket, and the first rotor bore define a sub-section of the bore cavity, the sub-section including a second rotor bore of a second rotor stage of the plurality of rotor stages.

8. The rotor section of claim 7, wherein the plurality of inlet apertures extend through the outer radial panel at the first axial position.

9. The rotor section of claim 8 wherein the plurality of exit apertures extend through the outer radial panel at the second axial position.

10. The rotor section of claim 9, wherein the plurality of inlet apertures and the plurality of exit apertures are circumferentially disposed around the outer radial panel.

11. The rotor section of claim 7, wherein the first rotor bore and the bore basket comprise the same material.

12. The rotor section of claim 7, wherein the inner radial panel and the outer radial panel are welded to one another, and the bore basket and the first rotor bore are welded to one another.

13. The rotor section of claim 7, wherein the hub structure (HS) includes a plurality of HS inlet apertures and a plurality of HS exit apertures, and the plurality of HS inlet apertures and the plurality of HS exit apertures in fluid communication with the sub-section of the bore cavity.

14. The rotor section of claim 7, wherein the sub-section is located at a forward portion of the bore cavity.

15. The rotor section of claim 7, wherein the sub-section is located at an aft portion of the bore cavity.

16. The rotor section of claim 7, further comprising a second bore basket having:
   a second engagement panel;
   a second cylindrical inner radial panel;

a second cylindrical outer radial panel, wherein the second inner radial panel and the second outer radial panel extend axially, and the second inner radial panel is disposed radially inside of and separated from the second outer radial panel, and a second annular passage is disposed between the second inner radial panel and the second outer radial panel;

a plurality of second inlet apertures in fluid communication with the second annular passage; and a plurality of second exit apertures in fluid communication with the second annular passage, the second inlet apertures axially separated from the second exit apertures;

wherein the second bore basket is integrally formed with a third rotor bore of a third rotor stage of the plurality of rotor stages, and extends outwardly from the inner radial hub of the third rotor bore; and wherein the second engagement panel is connected to the hub structure; and wherein the hub structure, the second bore basket, and the third rotor bore define a second sub-section of the bore cavity, the second sub-section including a fourth rotor bore of a fourth rotor stage of the plurality of rotor stages.

17. The rotor section of claim 7, wherein the rotor section is a compressor section.

18. The rotor section of claim 7, wherein the rotor section is a turbine section.

* * * * *